(12) United States Patent
Hikimochi et al.

(10) Patent No.: US 11,018,996 B2
(45) Date of Patent: May 25, 2021

(54) PACKET TRANSFER DEVICE AND PACKET TRANSFER METHOD

(71) Applicant: FUJITSU LIMITED, Kawasaki (JP)

(72) Inventors: Norikazu Hikimochi, Kanazawa (JP); Ryuichi Kimura, Kawasaki (JP); Shigemori Ookawa, Hakusan (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/404,968

(22) Filed: May 7, 2019

(65) Prior Publication Data
US 2019/0356612 A1 Nov. 21, 2019

(30) Foreign Application Priority Data

May 21, 2018 (JP) .............................. JP2018-096940

(51) Int. Cl.
*H04L 12/861* (2013.01)
*H04L 12/935* (2013.01)
*H04L 12/863* (2013.01)
*H04L 12/851* (2013.01)

(52) U.S. Cl.
CPC ...... *H04L 49/9084* (2013.01); *H04L 47/2441* (2013.01); *H04L 47/54* (2013.01); *H04L 47/6215* (2013.01); *H04L 47/6255* (2013.01); *H04L 49/3027* (2013.01)

(58) Field of Classification Search
CPC ............. H04L 49/9804; H04L 49/3027; H04L 47/2441; H04L 47/54; H04L 47/6215; H04L 47/6255
See application file for complete search history.

(56) References Cited

U.S. PATENT DOCUMENTS

| | | | | |
|---|---|---|---|---|
| 5,519,689 A | * | 5/1996 | Kim | H04L 49/206 370/232 |
| 5,892,762 A | * | 4/1999 | Okuda | H04L 49/205 370/395.42 |
| 6,560,198 B1 | * | 5/2003 | Ott | H04L 47/10 370/230 |
| 6,820,128 B1 | * | 11/2004 | Firoiu | H04L 47/10 370/229 |
| 7,768,919 B1 | * | 8/2010 | Conway | H04L 47/32 370/232 |

(Continued)

FOREIGN PATENT DOCUMENTS

| | | |
|---|---|---|
| JP | 2013-074514 | 4/2013 |
| JP | 2014-096700 | 5/2014 |

*Primary Examiner* — Candal Elpenord
(74) *Attorney, Agent, or Firm* — Fujitsu Patent Center

(57) ABSTRACT

A packet transfer device includes a circuit configured to include a first queue to store a first packet classified into a high priority class and a second queue to store a second packet classified into a low priority class, a memory configured to store data configured to indicate possibilities of output for the first packet and the second packet for each time slot, a processor coupled to the memory and configured to control the output of the first packet and the second packet for each time slot according to the data stored in the memory, count a number of discards of the second packet within the second queue in a predetermined cycle, and change the data stored in the memory, when the number of discards is less than a first predetermined value, so as to reduce an output period of the second packet every the time slot.

10 Claims, 16 Drawing Sheets

(56) References Cited

U.S. PATENT DOCUMENTS

| | | | |
|---|---|---|---|
| 7,843,818 B2* | 11/2010 | Chu | H04L 47/2416 370/230 |
| 2003/0189943 A1* | 10/2003 | Gorti | H04L 47/56 370/412 |
| 2003/0210681 A1* | 11/2003 | Sumi | H04L 47/2416 370/352 |
| 2004/0105393 A1* | 6/2004 | Ronneke | H04L 47/52 370/252 |
| 2009/0161684 A1* | 6/2009 | Voruganti | H04L 49/90 370/412 |
| 2013/0077510 A1 | 3/2013 | Nishimura et al. | |
| 2014/0269378 A1* | 9/2014 | Holbrook | H01L 25/18 370/252 |
| 2015/0207724 A1* | 7/2015 | Choudhury | H04L 45/42 370/255 |
| 2016/0128077 A1* | 5/2016 | Tsirkin | H04L 47/29 370/392 |

* cited by examiner

FIG. 6

| STATE NUMBER | CLOSE TS NUMBER | | GATE OPENING/CLOSING IN ONE CYCLE |
|---|---|---|---|
| #0 | - | OPEN / CLOSED | #1 #2 #3 #4 #5 #6 #7 #8 |
| #1 | #60 | OPEN / CLOSED | #1 #2 #3 #4 #5 #6 #7 #8 |
| #2 | #60, #29 | OPEN / CLOSED | #1 #2 #3 #4 #5 #6 #7 #8 |
| #3 | #60, #29, #35 | OPEN / CLOSED | #1 #2 #3 #4 #5 #6 #7 #8 |
| #4 | #60, #29, #35, #47, #48 | OPEN / CLOSED | #1 #2 #3 #4 #5 #6 #7 #8 |
| #5 | #60, #29, #35, #47, #48, #55 | OPEN / CLOSED | #1 #2 #3 #4 #5 #6 #7 #8 |
| #6 | #60, #29, #35, #47, #48, #55, #18, #19 | OPEN / CLOSED | #1 #2 #3 #4 #5 #6 #7 #8 |
| #7 | #60, #29, #35, #47, #48, #55, #18, #19, #10-12 | OPEN / CLOSED | #1 #2 #3 #4 #5 #6 #7 #8 |

FIG. 7

GATE CONTROL TABLE IN STATE #0

| TS NUMBER | GATE STATE | | TIME (μsec) |
|---|---|---|---|
| | #1 | #2 | |
| #1 | ○ | × | 100 |
| #2 | ○ | ○ | 100 |
| ... | | | |
| #59 | ○ | × | 0.3 |
| #60 | ○ | [○] | 0.01 |
| #61 | ○ | × | 1.5 |
| ... | | | |
| #N | ○ | × | 1.5 |

GATE CONTROL TABLE IN STATE #1

| TS NUMBER | GATE STATE | | TIME (μsec) |
|---|---|---|---|
| | #1 | #2 | |
| #1 | ○ | × | 100 |
| #2 | ○ | ○ | 100 |
| ... | | | |
| #59 | ○ | × | 0.3 |
| #60 | ○ | [×] | 0.01 |
| #61 | ○ | × | 1.5 |
| ... | | | |
| #N | ○ | × | 1.5 |

PACKET TRANSFER DEVICE AND PACKET TRANSFER METHOD

CROSS-REFERENCE TO RELATED APPLICATION

This application is based upon and claims the benefit of priority of the prior Japanese Patent Application No. 2018-096940, filed on May 21, 2018, the entire contents of which are incorporated herein by reference.

FIELD

The embodiments discussed herein are related to a packet transfer device and a packet transfer method.

BACKGROUND

In a 5th generation (5G) mobile network, in order to make a network configuration efficient, traffic of mobile back haul (MBH) and mobile front haul (MFH) flows through a common transmission path as packets. The MFH packets include, for example, high real-time data such as voice or communication data for telemedicine, and thus, requires a low delay time (e.g., 1 (ms)).

Therefore, studies are conducted on transfer of MFH packets prior to MBH packets in, for example, a layer 2 switch device within a network by using a technology of, for example, IEEE (Institute of Electrical and Electronic Engineers) 802.1 TSN (Time Sensitive Networking). Japanese Laid-open Patent Publication Nos. 2013-074514 and 2014-096700 disclose a technology on a priority control of packets.

Related techniques are disclosed in, for example, Japanese Laid-open Patent Publication Nos. 2013-074514 and 2014-096700.

SUMMARY

According to an aspect of the embodiments, a packet transfer device includes a circuit configured to include a first queue to store a first packet classified into a high priority class and a second queue to store a second packet classified into a low priority class having a lower priority than the high priority class, the circuit outputting the first packet and the second packet, a memory configured to store data configured to indicate possibilities of output for the first packet and the second packet for each time slot, a processor coupled to the memory and the processor configured to control the output of the first packet and the second packet for each time slot according to the data stored in the memory, count a number of discards of the second packet within the second queue in a predetermined cycle, and change the data stored in the memory, when the number of discards is less than a first predetermined value, so as to reduce an output period of the second packet every the time slot.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a view illustrating an example of a gate open/closed state table;

FIG. 7 is a view illustrating an example of a change of a gate control table;

DESCRIPTION OF EMBODIMENTS

According to the technology of IEEE802.1 TSN, it is possible to control the opening/closing of a gate provided for each class of packets, on the basis of a gate control list. In the gate control list, opening/closing of each gate is set for each time slot. Therefore, when the gate control list is generated according to an MFH traffic pattern, a layer 2 switch may preferentially transfer MFH packets.

The opening/closing of each gate is controlled by, for example, a processor such as a central processing unit (CPU). However, since a load for processing of opening/closing control of each time slot is high, there is a concern that, for example, other processings of a processor such as shaper band setting are affected. In relation to this, the use of a high performance processor is taken into consideration, but another problem arises in that the equipment cost increases.

Hereinafter, descriptions will be made on details of a technology capable of reducing a load of a packet processing with reference to the accompanying drawings.

Figure 1:
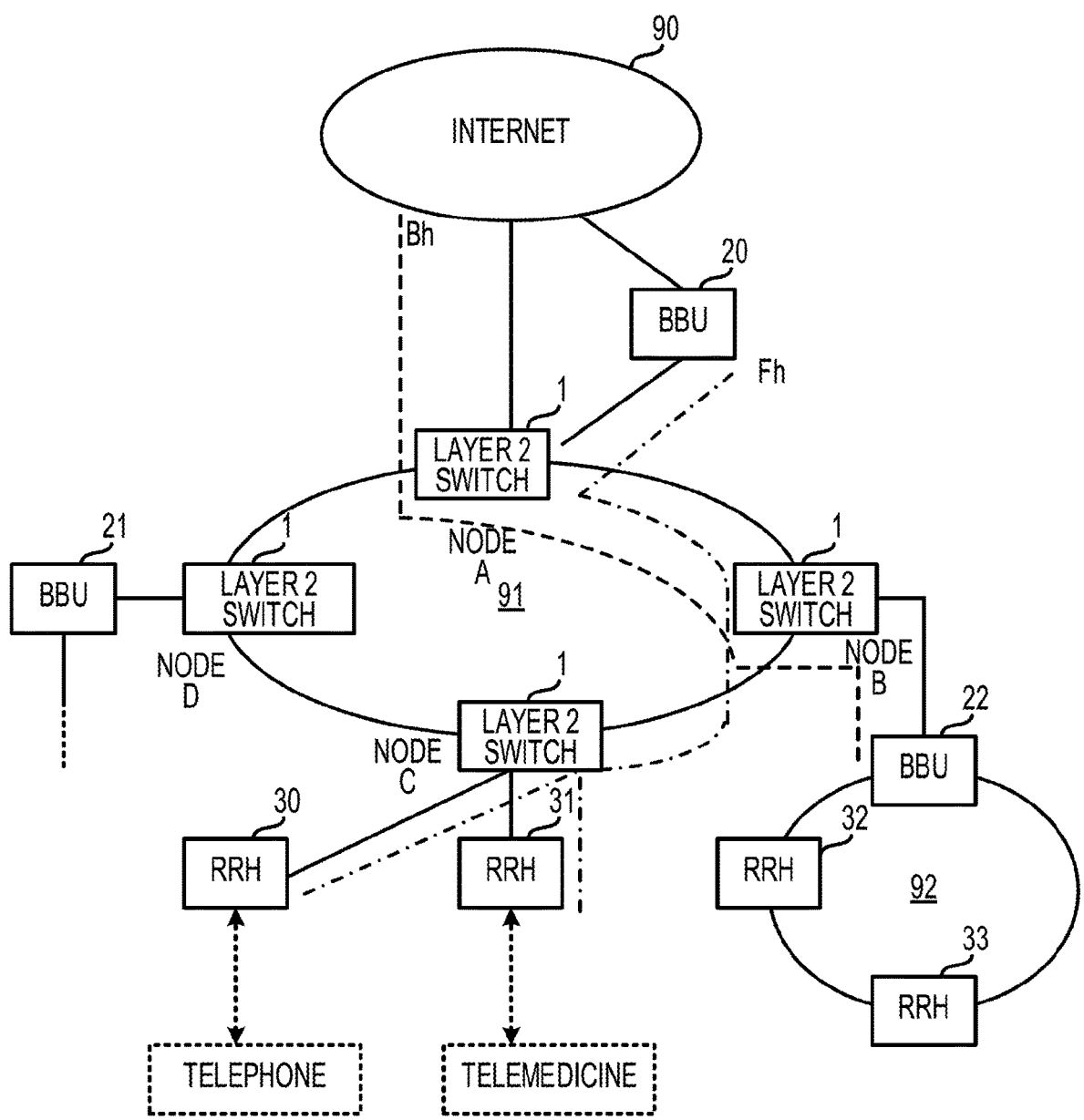
FIG. 1 is a configuration diagram illustrating an example of a 5G mobile network.

FIG. 1 is a configuration diagram illustrating an example of 5G mobile networks 91 and 92. In the mobile network 91, nodes A to D provided with layer 2 switches 1 are provided. As an example, the nodes A to D are connected in a ring shape. However, the present disclosure is not limited thereto, and the nodes A to D may be connected in a mesh shape. The layer 2 switch 1 is an example of a packet transfer device and transfers a packet received from another device, from a port corresponding to the destination thereof. As a packet, an Internet protocol (IP) packet may be exemplified, but the present disclosure is not limited thereto.

The layer 2 switch 1 at the node A is connected to the Internet 90 and a base band unit (BBU) 20. The BBU 20 is also connected to the Internet 90.

The layer 2 switch 1 at the node B is connected to a BBU 22 in another mobile network 92. In the mobile network 92, the BBU 22 and remote radio heads (RRH) 32 and 33 are included.

The layer 2 switch 1 at the node C is connected to RRHs 30 and 31. The RRHs 30 and 31 are connected to a telephone or a communication terminal used for telemedicine. The layer 2 switch 1 at the node D is connected to a BBU 21 in another mobile network (not illustrated) similarly to the node B.

A path Bh (see a dotted line) is an example of an MBH traffic path, and a path Fh (see a dash-dotted line) is an example of an MFH traffic path. The path Bh passes through the Internet 90, the respective layer 2 switches 1 at the nodes A and B, and the BBU 22, in this order. The path Fh passes through the BBU 20, the respective layer 2 switches 1 at the nodes A to C, and the RRHs 30 and 31, in this order.

Thus, the path Bh and the path Fh share a transmission path between the node A and the node B. Therefore, the layer 2 switch 1 at each of the nodes A and B performs a transfer processing of MBH and MFH traffic. In the following description, a packet included in the MBH traffic is denoted by an "MBH packet," and a packet included in the MFH traffic is denoted by an "MFH packet."

In the respective layer 2 switches 1 at the nodes A and B, a conflict occurs between the MBH packet and the MFH packet. The MFH packet includes, for example, high real-time data such as voice or communication data for telemedicine, and thus requires a low delay time (e.g., 1 (ms)).

Thus, the layer 2 switch 1 transfers the MFH packet prior to the MBH packet by using a technology of IEEE802.1 TSN as an example. In the present example, a conflict between the MBH packet and the MFH packet is exemplified. Meanwhile, when an access line for optical communication service is accommodated in the mobile network 91, the MFH packet conflicts with the line as well as the MBH packet.

Figure 2:
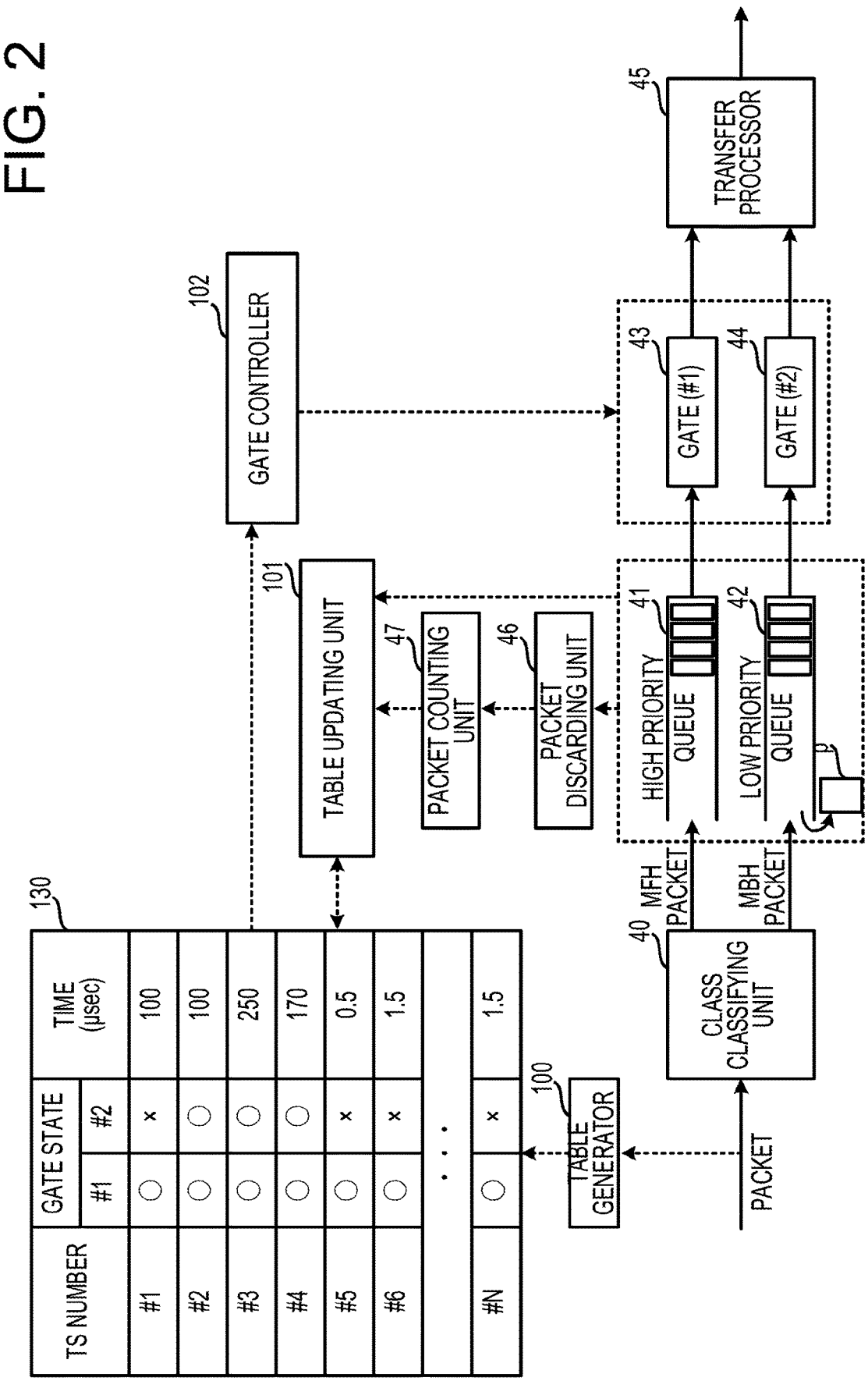
FIG. 2 is a configuration diagram illustrating an example of a configuration in which a packet priority control is implemented.

FIG. 2 is a configuration diagram illustrating an example of a configuration in which a packet priority control is implemented. The layer 2 switch 1 includes a class classifying unit 40, a high priority queue 41, a low priority queue 42, a gate (#1) 43, a gate (#2) 44, a transfer processor 45, a packet discarding unit 46, a packet counting unit 47, a table generator 100, a table updating unit 101, and a gate controller 102.

The class classifying unit 40 classifies packets received by the layer 2 switch 1, by class. The class classifying unit 40 classifies an MFH packet into a high priority class and outputs the MFH packet to the high priority queue 41, and classifies an MBH packet into a low priority class having a lower priority than the high priority class and outputs the MBH packet to the low priority queue 42. When another type of packet is input, the class classifying unit 40 classifies the packet into a low priority class.

The gate (#1) 43 is an example of a high priority output unit, and outputs the MFH packet within the high priority queue 41 to the transfer processor 45. The gate (#2) 44 is an example of a low priority output unit, and outputs the MBH packet within the low priority queue 42 to the transfer processor 45.

The gates 43 and 44 have an open state and a closed state. The gates 43 and 44 read and output the MFH packet and the MBH packet from the high priority queue 41 and the low priority queue 42, respectively, in the open state, and stop reading of the MFH packet and the MBH packet, in the closed state.

Thus, the MFH packet within the high priority queue 41 stays when the gate (#1) 43 is in a closed state, and the MBH packet within the low priority queue 42 stays when the gate (#2) 44 is in a closed state.

The layer 2 switch 1 controls the output of the MFH packet and the MBH packet on the basis of a time aware shaper (TAS) method according to the technology of IEEE802.1 TSN and controls the open/closed state of the gates 43 and 44 according to a gate control table 130. In the gate control table 130, a list indicating the state of each of the gates 43 and 44 for each time slot is registered.

In the gate control table 130, a "TS number" indicates a number (#1 to #N (N: an integer of 2 or more)) identifying a time slot (TS), and a "time" indicates a time (time width) of a time slot. The sum of time slots #1 to #N corresponds to a cycle of gate control.

A "gate state" indicates the open/closed state ("○": open state, "x": closed state) of the gate (#1) 43 (see "#1") and the gate (#2) 44 (see "#2"). When the gates 43 and 44 are in an open state, it is possible to output packets, and in the case of a closed state, it is impossible to output packets.

In this manner, the gate control table 130 indicates whether it is possible to output packets from each of the high priority queue 41 and the low priority queue 42 for each time slot. The gate control table 130 is an example of a table.

The table generator 100 analyzes a pattern (traffic pattern) of packets received by the layer 2 switch 1, and generates the gate control table 130 on the basis of the analysis result. For example, since MFH packets are sent from the BBU 20 in a burst manner every sub-frame of 1 (msec), the table generator 100 detects the periodicity of an arrival amount of the MFH packets at a fixed time interval a predetermined number of times.

The table generator 100 determines the cycle of gate control from the detection result. The table generator 100 generates statistical information by detecting the head and the length of MFH packets a plurality of times, and generates the gate control table 130 on the basis of the statistical information such that the gate (#1) 43 on the high priority class side is in an open state, and the gate (#2) 44 on the low priority class side is in a closed state for a time slot in which the MFH packets arrive.

According to the number of discarded MBH packets in the low priority queue 42, the table updating unit 101 updates the gate control table 130 so as to reduce a period during which the gate (#2) 44 on the low priority class side is temporally and continuously in an open state (hereinafter, referred to as an "open period"). Thus, when in the open period of the gate 44, there is a sufficient margin for an input amount of MBH packets for the low priority queue 42, the open period is reduced.

Accordingly, the number of opening/closing processings of the gate 44 is reduced, and thus the load of a packet processing is reduced.

In the following example, the table updating unit 101 updates the gate control table 130 so as to reduce an open period of a predetermined value (e.g., 500 (psec)) or less, as an example. Thus, it becomes possible to avoid the deletion of the open period during which MBH packets are highly likely to arrive depending on the predetermined value, and further to suppress occurrence of a high load due to opening/closing processings of the gate 44 within a short time. However, the open period to be reduced is not limited.

The packet discarding unit 46 discards an MBH packet when there is no empty space in the low priority queue 42 as indicated by, for example, a sign p. The packet discarding unit 46 discards an MFH packet in relation to the high priority queue 41 as well, in the same manner as described above.

The packet counting unit 47 is an example of a counting unit, and counts the number of MBH packets discarded in the low priority queue 42 in each cycle of gate control (hereinafter, referred to as the "number of discards"). The packet counting unit 47 counts the number of discards in relation to MFH packets as well, in the same manner as described above.

The table updating unit 101 acquires the number of discarded MBH packets from the packet counting unit 47, and acquires the storage amount of MBH packets within the low priority queue 42 from the low priority queue 42.

MFH packets and MBH packets output from the gates 43 and 44 in an open state are input to the transfer processor 45. In the transfer processor 45, a shaper etc. that controls a transmission band of packets is provided.

Figure 3:
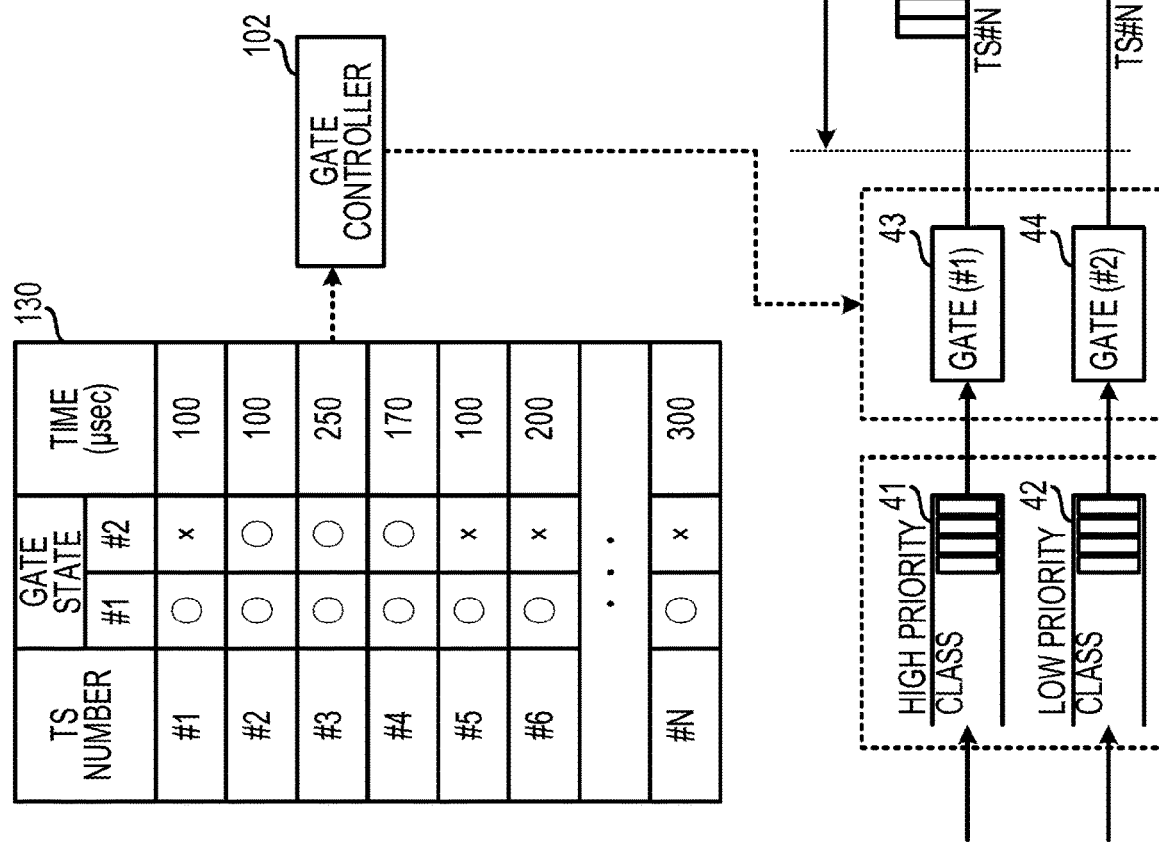
FIG. 3 is a view illustrating an example of gate control.

FIG. 3 is a view illustrating an example of gate control. In FIG. 3, configurations common to those in FIG. 2 are given the same signs, and descriptions thereof will be omitted.

The gate controller 102 is an example of an output controller, and controls the output of packets from each of the gates 43 and 44 for each time slot according to the gate control table 130. On the time axis extending from the gates 43 and 44, MFH packets or MBH packets output for each of time slots (TS)#1 to #N are illustrated.

For example, the gate controller 102 sets the gate (#1) 43 to an open state and sets the gate (#2) 44 to a closed state, for the time slot #1 according to the gate control table 130. Thus, at the timing of the time slot #1, MFH packets are output from the high priority queue 41 whereas MBH packets are not output from the low priority queue 42.

The gate controller 102 sets the gate (#1) 43 to an open state and sets the gate (#2) 44 to an open state, for the time slots #2 to #4 according to the gate control table 130. Thus, at the timing of the time slots #2 to #4, it becomes possible to output MFH packets from the high priority queue 41 and it becomes possible to output MBH packets from the low priority queue 42. In the present example, the low priority queue 42 is selected and MBH packets are output. The gate control for the time slots #1 to #N is repeatedly executed in the cycle T.

Hereinafter, a hardware configuration and a functional configuration of the layer 2 switch 1 will be described.

Figure 4:
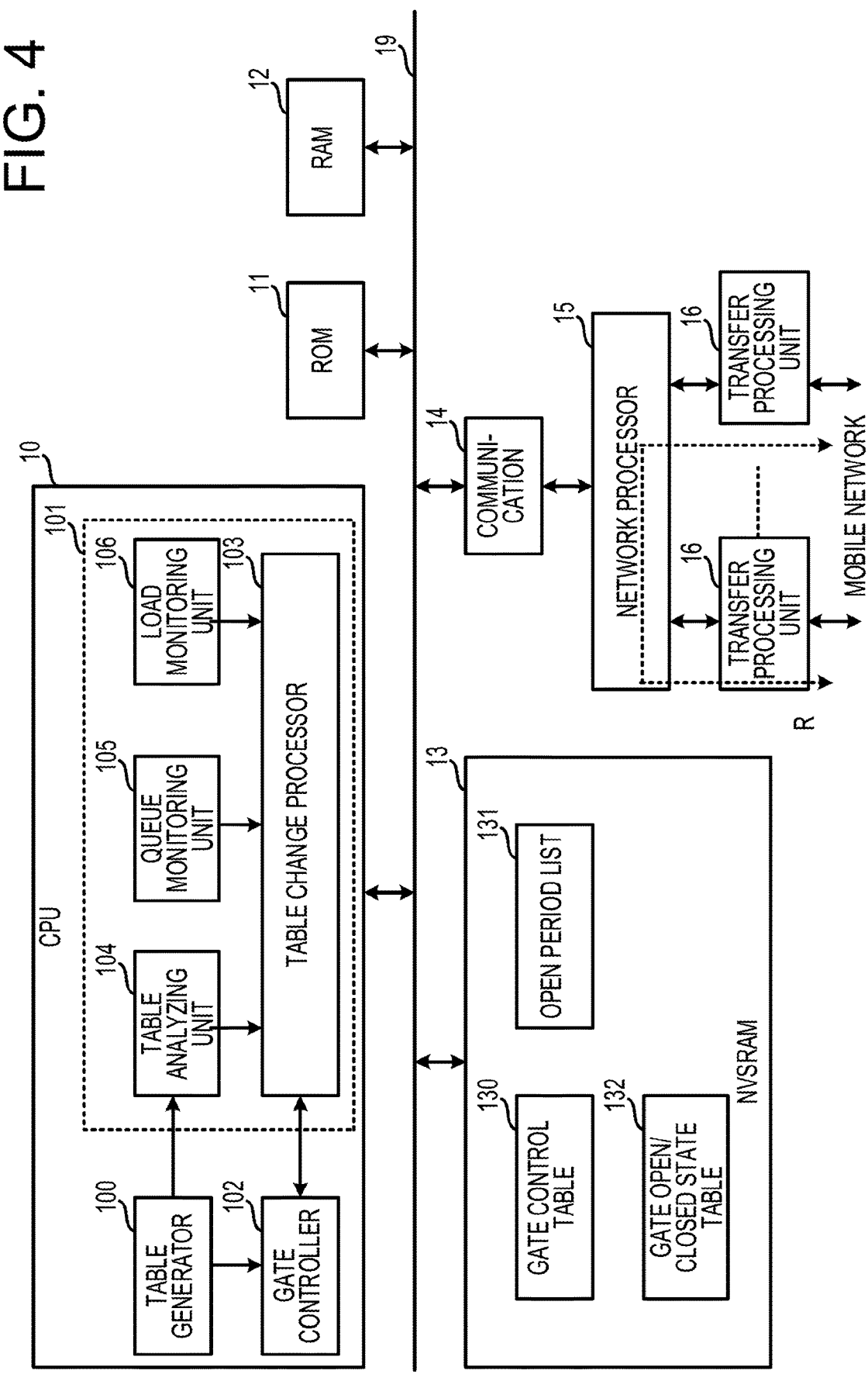
FIG. 4 is a configuration diagram illustrating an example of a layer 2 switch.

FIG. 4 is a configuration diagram illustrating an example of the layer 2 switch 1. In FIG. 4, configurations common to those in FIG. 2 are given the same signs and descriptions thereof will be omitted. The layer 2 switch 1 is configured as, for example, an electronic circuit board accommodated in a casing, or a blade type electronic circuit unit accommodated in a rack.

The layer 2 switch 1 includes a CPU 10, a read only memory (ROM) 11, a random access memory (RAM) 12, a non-volatile static random access memory (NVSRAM) 13, and a communication interface unit (communication IF) 14. The layer 2 switch 1 further includes a network processor 15 and a plurality of transfer processing units 16. The CPU 10 is connected to the ROM 11, the RAM 12, the NVSRAM 13, and the communication IF 14 via a bus 19 such that these may input/output signals to each other. The layer 2 switch 1 may further include an application specific standard product (ASSP) that cooperates with the network processor 15.

The transfer processing unit 16 includes, for example, an optical transmission/reception module or a field programmable gate array (FPGA) and processes the transmission/reception of packets. As indicated by a path R, the transfer processing unit 16 outputs packets received from another device to the network processor 15, and sends packets input from the network processor 15 to another device. The transfer processing unit 16 is configured as, for example, a circuit board on which electrical components and optical components are mounted.

The network processor 15 has functions of virtual local area network (VLAN), media access control (MAC), quality of service (QoS), and operation, administration and maintenance (OAM). As the function of QoS, the network processor 15 includes the class classifying unit 40, the high priority queue 41, the low priority queue 42, the gates 43 and 44, and the transfer processor 45 as described above. The network processor 15 processes packets input from the transfer processing units 16, by the class classifying unit 40, the high priority queue 41, the low priority queue 42, the gates 43 and 44, and the transfer processor 45, and outputs the packets to the transfer processing units 16 corresponding to destinations.

The network processor 15 is connected to the bus 19 via the communication IF 14 and communicates with the CPU 10. The communication IF 14 is a circuit composed of, for example, hardware such as an FPGA or an application specific integrated circuit (ASIC).

In the ROM 11, a program that drives the CPU 10 is stored. The RAM 12 functions as a working memory of the CPU 10.

When the CPU 10 reads a program from the ROM 11, the table generator 100, the table updating unit 101, and the gate controller 102 are formed as functions. The CPU 10 performs a packet processing by each of the functions. In the NVSRAM 13, the gate control table 130, an open period list 131, and a gate open/closed state table 132 are stored. The NVSRAM 13 is an example of a storage unit. Above all, instead of the NVSRAM 13, another storage unit such as a hard disk drive may be used.

The table generator 100 and the gate controller 102 are as described above. Upon generating the gate control table 130, the table generator 100 notifies the gate controller 102 and the table updating unit 101 of the purport. The gate controller 102 starts gate control according to notification from the table generator 100.

The gate controller 102 performs the gate control according to an instruction from the table updating unit 101, and notifies the table updating unit 101 of the completion of the gate control.

The gate controller 102 performs the opening/closing processings of the gates 43 and 44 according to the gate control table 130. The gate controller 102 performs the opening/closing processings by accessing, for example, a register for gate control within an address space of the network processor 15. Here, the CPU 10 performs a control of, for example, the communication IF 14 and the bus 19 as well so as to communicate with the network processor 15.

The gate controller 102 performs the opening/closing processings of all the gates 43 and 44 corresponding to respective transmission/reception ports of the transfer processing units 16. Thus, the load of the opening/closing processings of the gates 43 and 44 increases according to the total number of transmission/reception ports of all the transfer processing units 16. Accordingly, when the opening/closing processings are repeated within a short time, there is a concern that a large load may be applied to the CPU 10. Thus, the table updating unit 101 changes the gate control table 130 such that the number of opening/closing processings of the gate 44 is reduced.

The table updating unit 101 includes a table change processor 103, a table analyzing unit 104, a queue monitoring unit 105, and a load monitoring unit 106. The table analyzing unit 104 generates the open period list 131 from the gate control table 130 according to notification from the table generator 100.

Figure 5:
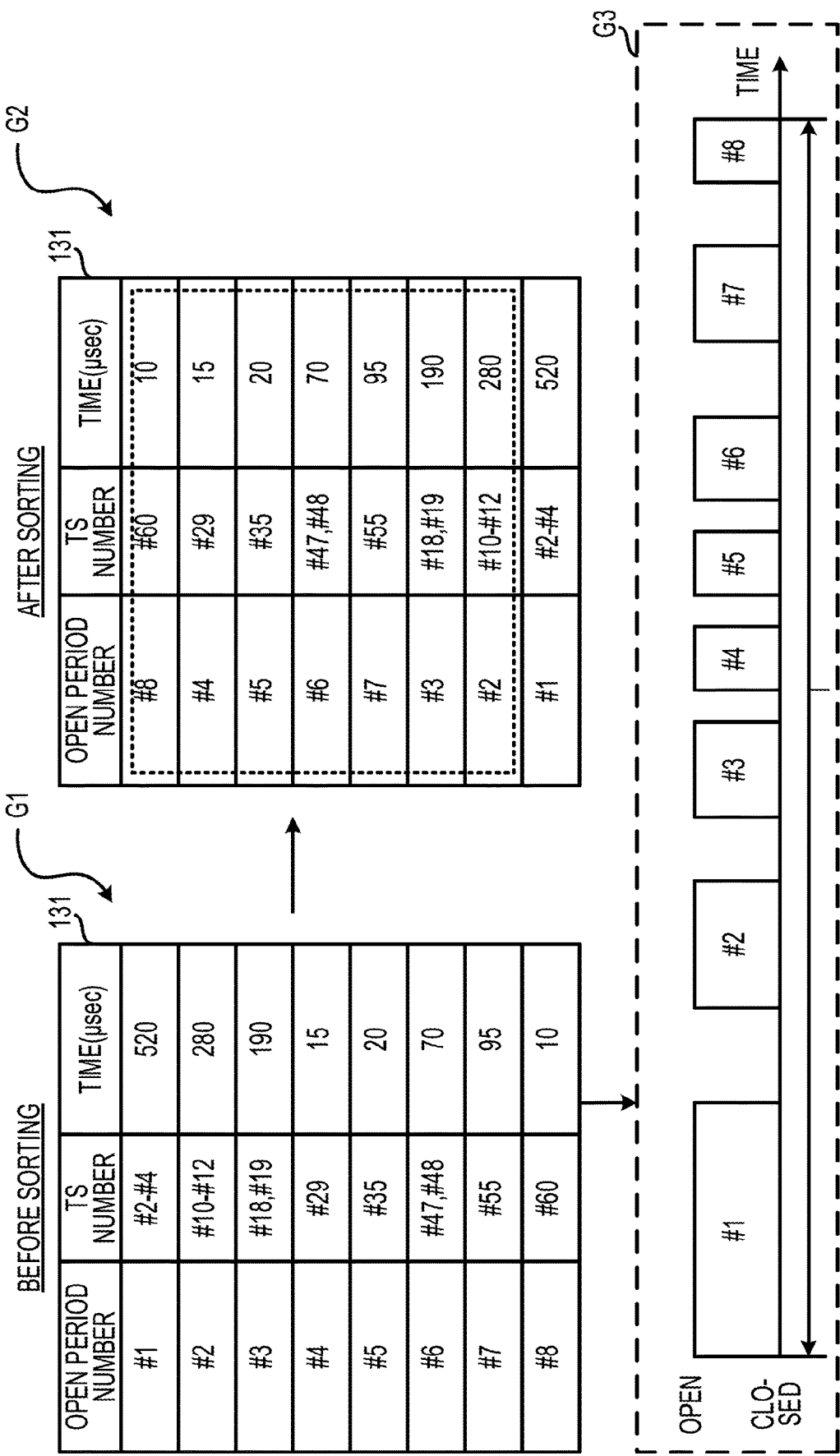
FIG. 5 is a view illustrating an example of an open period list.

FIG. 5 is a view illustrating an example of the open period list 131. The table analyzing unit 104 generates the open period list 131 by extracting an open period of the gate (#2) 44 with a low priority class from the gate control table 130. For example, the table analyzing unit 104 searches the gate control table 130 for one or more time slots in which the gate (#2) 44 is continuously placed in an open state, and then registers an open period including the one or more time slots, in the open period list 131.

Referring to a sign G1, an "open period number," a "TS number," and a "time" are registered in the open period list 131. The "open period number" (#1 to #8) is a number that identifies an open period. The "TS number" indicates a TS number of a time slot within an open period. The "time" indicates a length of an open period, that is, the sum of respective time slots.

For example, in the case of the gate control table 130 illustrated in FIG. 2, the gate (#2) 44 is set in an open state for the consecutive time slots #2 to #4. Thus, the table analyzing unit 104 registers TS numbers for the time slots #2 to #4 and a total time, with an open period #1, in the open period list 131.

A sign G3 indicates open periods of the gate (#2) 44 based on the open period list 131, on a time axis. The open periods #1 to #8 are repeated in each cycle T of gate control.

After generating the open period list 131, the table analyzing unit 104 sorts the open period list 131 in ascending order of "time" (a length of an open period). A sign G2 indicates an example of the open period list 131 after sorting. The open period list 131 is sorted in the order of open periods #8, #4, #5, #6, #7, #3, #2, and #1.

As an example, the table analyzing unit 104 extracts open periods #8, #4, #5, #6, #7, #3, and #2 of 500 (psec) or less (see a dotted line frame). The extracted open periods #8, #4, #5, #6, #7, #3, and #2 are candidates to be deleted from the gate control table 130 according to the number of discarded MBH packets. Each of time slots within the deleted open periods is set to a closed state, in the gate control table 130.

In this manner, the table analyzing unit 104 sets an open period in which the "time" is a predetermined value or less, as a deletion candidate. That is, the table analyzing unit 104 detects the open periods #8, #4, #5, #6, #7, #3, and #2 of a predetermined value or less during which the output of MBH packets within a low priority queue becomes continuously possible, from the gate control table 130. Accordingly, the open periods #8, #4, #5, #6, #7, #3, and #2 during which opening/closing processings are performed within a short time are extracted from the gate control table 130.

Thus, it becomes possible to effectively reduce the load by deleting open periods having a relatively large influence on the load of the CPU 10. In the present example, as the above described predetermined value, 500 (μsec) is exemplified, but the present disclosure is not limited thereto. The predetermined value may be determined, for example, according to a time required when the CPU 10 sets the network processor 15, or may be set to a value settable by a user. In the present example, the table analyzing unit 104 sets an open period of a predetermined value or less, as a deletion candidate, but the present disclosure is not limited thereto. The deletion candidate may be selected regardless of a length of an open period.

Referring back to FIG. 4, the table analyzing unit 104 generates the gate open/closed state table 132 from the open period list 131. The table change processor 103 changes the gate control table 130 on the basis of the state of the gate control table 130 registered in the gate open/closed state table 132.

FIG. 6 is a view illustrating an example of the gate open/closed state table 132. In the gate open/closed state table 132, a "state number" (#0 to #7) that identifies the state of the gate control table 130, and a "close TS number" that identifies a time slot during which the state is to be changed to a closed state are registered. A "gate opening/closing in one cycle" indicates the form of gate control in each state, as a reference. Here, an open period indicated by a dotted line represents a deleted open period.

In the gate control table 130 in a state #0, since no open periods #1 to #8 are deleted, the gate (#2) 44 is placed in an open state in each of the open periods #1 to #8. In the gate control table 130 in a state #1, since the shortest open period #8 is deleted, the gate (#2) 44 is placed in an open state in each of the open periods #1 to #7.

In the gate control table 130 in a state #2, since the first and second shortest open periods #8 and #4 are deleted, the gate (#2) 44 is placed in an open state in each of the open periods #1 to #3, and #5 to #7. In the gate control table 130 in a state #3, since the first to third shortest open periods #8, #4, and #5 are deleted, the gate (#2) 44 is placed in an open state in each of the open periods #1 to #3, #6, and #7.

In the gate control table 130 in a state #4, since the first to fourth shortest open periods #8, and #4 to #6 are deleted, the gate (#2) 44 is placed in an open state in each of the open periods #1 to #3, and #7. In the gate control table 130 in a state #5, since the first to fifth shortest open periods #4 to #8 are deleted, the gate (#2) 44 is placed in an open state in each of the open periods #1 to #3.

In the gate control table 130 in a state #6, since the first to sixth shortest open periods #3 to #8 are deleted, the gate (#2) 44 is placed in an open state in each of the open periods #1 and #2. In the gate control table 130 in a state #7, since the first to seventh shortest open periods #2 to #8 are deleted, the gate (#2) 44 is placed in an open state in the open period #1. The open period #1 is equal to or greater than 500 (psec), and thus is not deleted.

The "close TS number" is a TS number of a time slot included in an open period to be deleted in the gate control table 130 with each of the states #1 to #7, as compared to that in the gate control table 130 in the state #0. That is, the "close TS number" is a TS number corresponding to an open period to be deleted in the gate control table 130.

Referring back to FIG. 4, the table change processor 103 sets the gate control table 130 that is immediately generated by the table generator 100, to the state #0, and changes the state of the gate control table 130 step by step according to the number of discarded MBH packets in the low priority queue 42. The queue monitoring unit 105 acquires the number of discarded MBH packets from the packet counting unit 47, and notifies the table change processor 103 of the number.

For example, when the number of discarded MBH packets in the cycle T is less than a predetermined threshold TH, the table change processor 103 determines that in the open period of the gate 44, there is a sufficient margin for an input amount of MBH packets for the low priority queue 42, and raises the state of the gate control table 130 by only one step. More specifically, the table change processor 103 changes the state of the gate control table 130 in a direction in which the state number increases.

While the number of discarded MBH packets in the cycle T is less than the predetermined threshold TH, the table change processor 103 gradually raises the state of the gate control table 130 step by step. When the number of discards is equal to or greater than the predetermined threshold TH, the table change processor 103 lowers the state of the gate control table 130 by only one step. Accordingly, under the condition that the number of discarded MBH packets is less than the predetermined threshold TH, it becomes possible to delete the maximum number of open periods in order from the shortest.

The table change processor 103 changes the gate control table 130 on the basis of the gate open/closed state table 132. Hereinafter, descriptions will be made on an example in which the gate control table 130 is changed from the state #0 to the state #1.

FIG. 7 is a view illustrating an example of a change of the gate control table 130. In the gate open/closed state table 132 illustrated in FIG. 6, #60 is registered as a close TS number in the state #1.

Thus, when the gate control table 130 is changed from the state #0 to the state #1, the table change processor 103 rewrites a gate state of the gate (#2) 44 corresponding to the TS number #60 in the gate control table 130, from "0" to "x" (see a dotted line frame). Accordingly, the open period #8 is deleted in the gate control table 130. When there are a plurality of close TS numbers corresponding to the changed state, the table change processor 103 rewrites the gate states corresponding to all the close TS numbers into "x."

In this manner, the table change processor 103 is an example of a change processor, and changes the gate control table 130 such that an open period of the gate 44 is reduced on the basis of a time slot when the number of discarded MBH packets does not reach the threshold TH. Thus, when in the open period of the gate 44, there is a sufficient margin for an input amount of MBH packets for the low priority queue 42, since the number of opening/closing processings of the gate 44 of the low priority queue 42 is reduced, the load of the CPU 10 is reduced.

Therefore, in the layer 2 switch 1, the load of a packet processing is reduced.

Referring back to FIG. 4, when generation of the open period list 131 and the gate open/closed state table 132 is completed, the table analyzing unit 104 notifies the table change processor 103 of the purport. According to the notification, the table change processor 103 starts the above described change processing of the gate control table 130. In the following description, a state where the table change processor 103 is performing a change processing will be referred to as a "table changing state."

When the number of discarded MBH packets is equal to or greater than the threshold TH, the table change processor 103 returns the gate control table 130 to a state immediately before the latest change is performed. That is, when the number of discarded MBH packets reaches the threshold TH, the table change processor 103 changes the gate control table 130 such that for each time slot within a period of a predetermined value or less which makes the output of MBH packets impossible, the output of MBH packets becomes possible.

Thus, under the condition that the number of discarded MBH packets is less than the predetermined threshold TH, the table change processor 103 may delete the maximum number of open periods. Therefore, in the layer 2 switch 1, the load of a packet processing is more effectively reduced.

After returning the gate control table 130 to a state immediately before the latest change is performed, the table change processor 103 shifts to a steady state. In this manner, when the number of discarded MBH packets reaches the threshold TH, the table change processor 103 changes the gate control table 130 such that the output of packets becomes possible, and then shifts to a steady state. In the steady state, the table change processor 103 changes the gate control table 130 according to an increment of the storage amount of MBH packets within the low priority queue 42, in each cycle T. Details of the change processing will be described below.

The queue monitoring unit 105 monitors the storage amount of MBH packets within the low priority queue 42 in each cycle T of gate control. The queue monitoring unit 105 notifies the table change processor 103 of the storage amount of the MBH packets.

The load monitoring unit 106 monitors the load of a packet transfer processing in the CPU 10. The load monitoring unit 106 notifies the table change processor 103 of the load of the CPU 10. The table change processor 103 may change the gate control table 130 according to the load of the CPU 10 as described below.

Hereinafter, descriptions will be made on a processing of the CPU 10 in relation to gate control. The following processing is an example of a packet transfer method.

Figure 8:
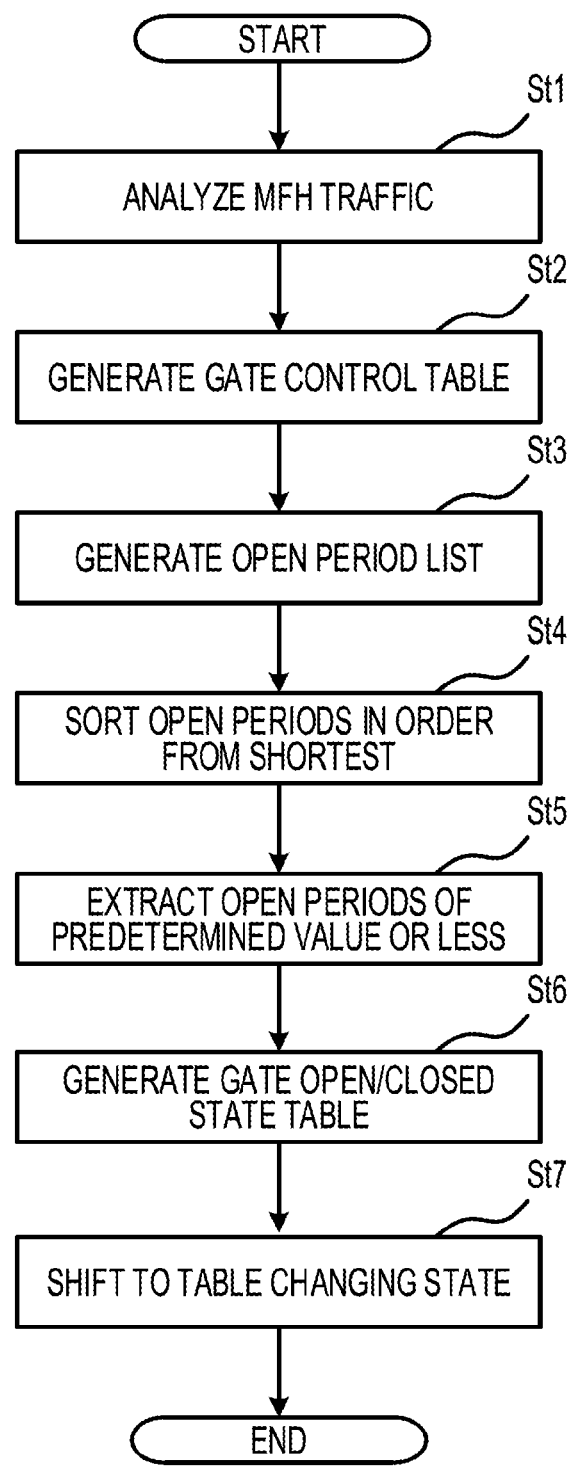
FIG. 8 is a flowchart illustrating an example of a processing at the start of packet transfer.

FIG. 8 is a flowchart illustrating an example of a processing at the start of packet transfer. Since at the start of packet transfer, the gate control table 130 is not generated, each of the gates 43 and 44 may be always placed in an open state.

The table generator 100 analyzes traffic of MFH packets input to the network processor 15 from the transfer processing unit 16 (operation St1). Then, the table generator 100 generates the gate control table 130 on the basis of the analysis result (operation St2).

Next, the table analyzing unit 104 analyzes the gate control table 130, and generates the open period list 131 according to the analysis result (operation St3). Here, the table analyzing unit 104 searches the gate control table 130 for consecutive time slots in which the gate (#2) 44 on the low priority class side is placed in an open state, thereby specifying an open period and one or more time slots within the open period.

Next, the table analyzing unit 104 sorts open periods within the open period list 131 in order from the shortest (operation St4). Then, the table analyzing unit 104 extracts open periods of a predetermined value or less from the open period list 131 (operation St5).

Next, the table analyzing unit 104 generates the gate open/closed state table 132 on the basis of the extraction result of the open periods of the predetermined value or less (operation St6). Here, the table analyzing unit 104 specifies a TS number of each of time slots within the open periods of the predetermined value or less, as a close TS number, from the open period list 131.

Next, the table change processor 103 shifts to a table changing state according to notification from the table analyzing unit 104 (operation St7). In this manner, the processing at the start of packet transfer is executed.

Figure 9:
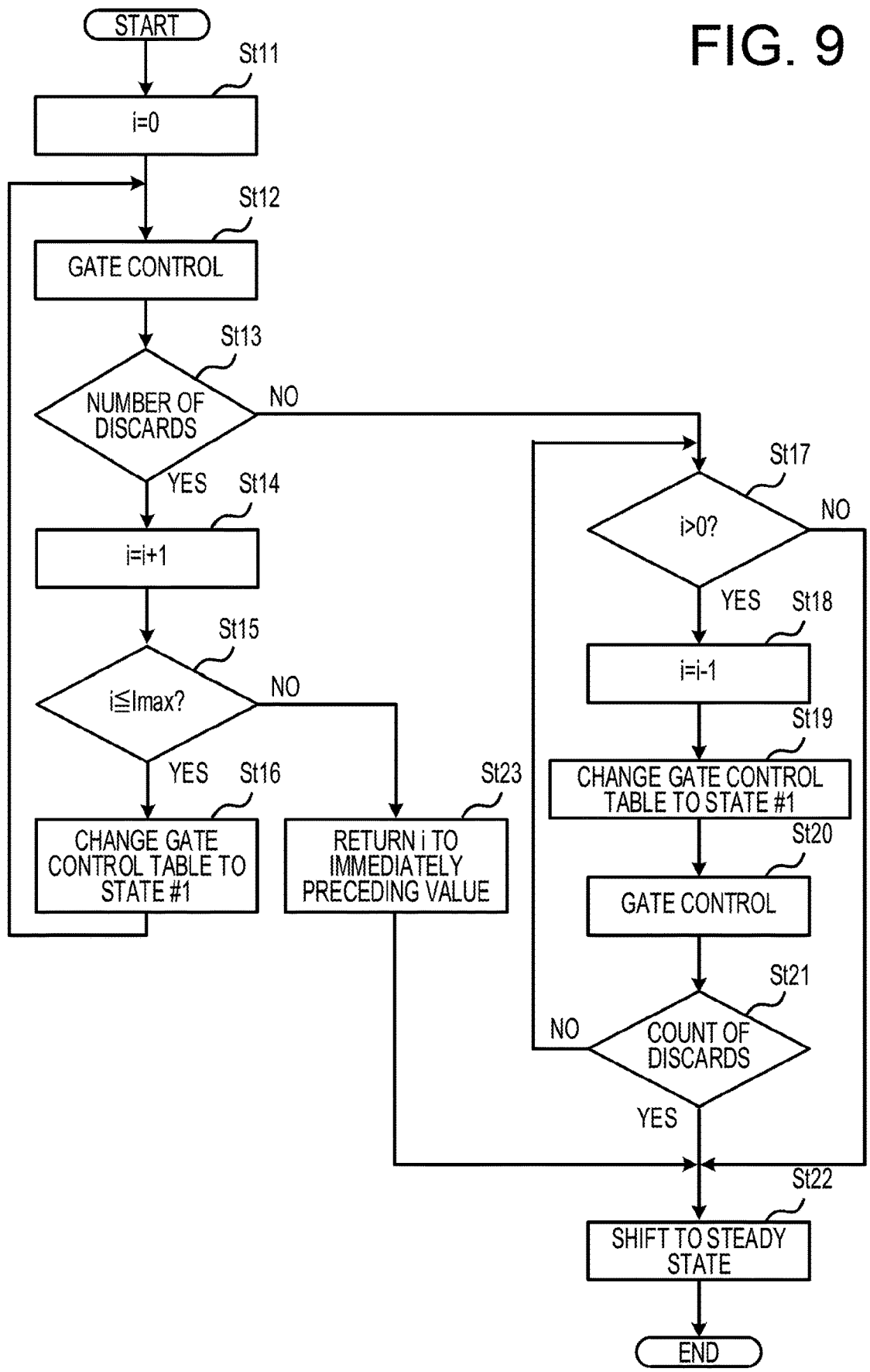
FIG. 9 is a flowchart illustrating an example of a change processing of the gate control table.

FIG. 9 is a flowchart illustrating an example of a change processing of the gate control table 130. This processing is executed after the table change processor 103 shifts to a table changing state.

The table change processor 103 sets a variable i indicating a state number of the gate control table 130, to 0 (operation St11). Then, the gate controller 102 controls opening/closing of the gate (#1) 43 and the gate (#2) 44 according to the gate control table 130 (gate control) (operation St12). Here, the gate controller 102 controls the opening/closing of each of the gates 43 and 44 by setting, for example, a register of the network processor 15. The gate controller 102 executes gate control for a cycle T.

Next, the table change processor 103 acquires the number of discarded MBH packets within the cycle T from the queue monitoring unit 105, and compares the number to a threshold TH (operation St13). The threshold TH is determined according to a characteristic of traffic of MBH packets, and is, for example, 1.

When the number of discards is less than the threshold TH ("Yes" in operation St13), the table change processor 103 adds 1 to the variable i (operation St14). Then, the table change processor 103 compares the variable i to a predetermined value Imax (operation St15). The predetermined value Imax is determined according to the number of states of the gate control table 130. In the present example, since there are states #0 to #7, the predetermined value Imax becomes 7.

When the variable i is equal to or less than the predetermined value Imax ("Yes" in operation St15), the table change processor 103 changes the gate control table 130 to a state #i (operation St16). Here, the table change processor 103 changes the gate control table 130, on the basis of a state number and a close TS number in the state #i in the gate open/closed state table 132. Thereafter, respective processings subsequently to operation St12 are executed again.

When the variable i is larger than the predetermined value Imax ("No" in operation St15), since the state #i is not present, the table change processor 103 returns the variable i to an immediately preceding value (operation St23), and shifts to a steady state (operation St22). In the steady state, a change of the gate control table 130 according to the number of discarded MBH packets is not performed.

When the number of discards is equal to or greater than the threshold TH ("No" in operation St13), the table change processor 103 determines whether the variable i is larger than 0 (operation St17). Accordingly, the table change processor 103 determines whether the gate control table 130 is in an initial state #0.

When the variable i is equal to or less than 0 ("No" in operation St17), the table change processor 103 determines that the gate control table 130 is in the initial state #0, and shifts to the steady state (operation St22).

When the variable i is equal to or greater than 1 ("Yes" in operation St17), the table change processor 103 subtracts 1 from the variable i (operation St18). Next, the table change processor 103 changes the gate control table 130 to the state #i (operation St19). Then, the gate controller 102 controls opening/closing of the gate (#1) 43 and the gate (#2) 44 according to the gate control table 130 (gate control) (operation St20).

Next, the table change processor 103 acquires the number of discarded MBH packets within the cycle T from the queue monitoring unit 105, and compares the number to the threshold TH (operation St21). When the number of discards is less than the threshold TH ("Yes" in operation St21), the table change processor 103 shifts to the steady state (operation St22).

When the number of discards is equal to or greater than the threshold TH ("No" in operation St21), respective processings subsequently to operation St17 are executed again. Accordingly, until the number of discards becomes less than the threshold TH, the table change processor 103 changes the state of the gate control table 130 step by step toward the initial state #0. In this manner, the change processing of the gate control table 130 is executed.

Hereinafter, descriptions will be made on a change example of the state of the gate control table 130, with reference to the above described flowchart.

Figure 10:
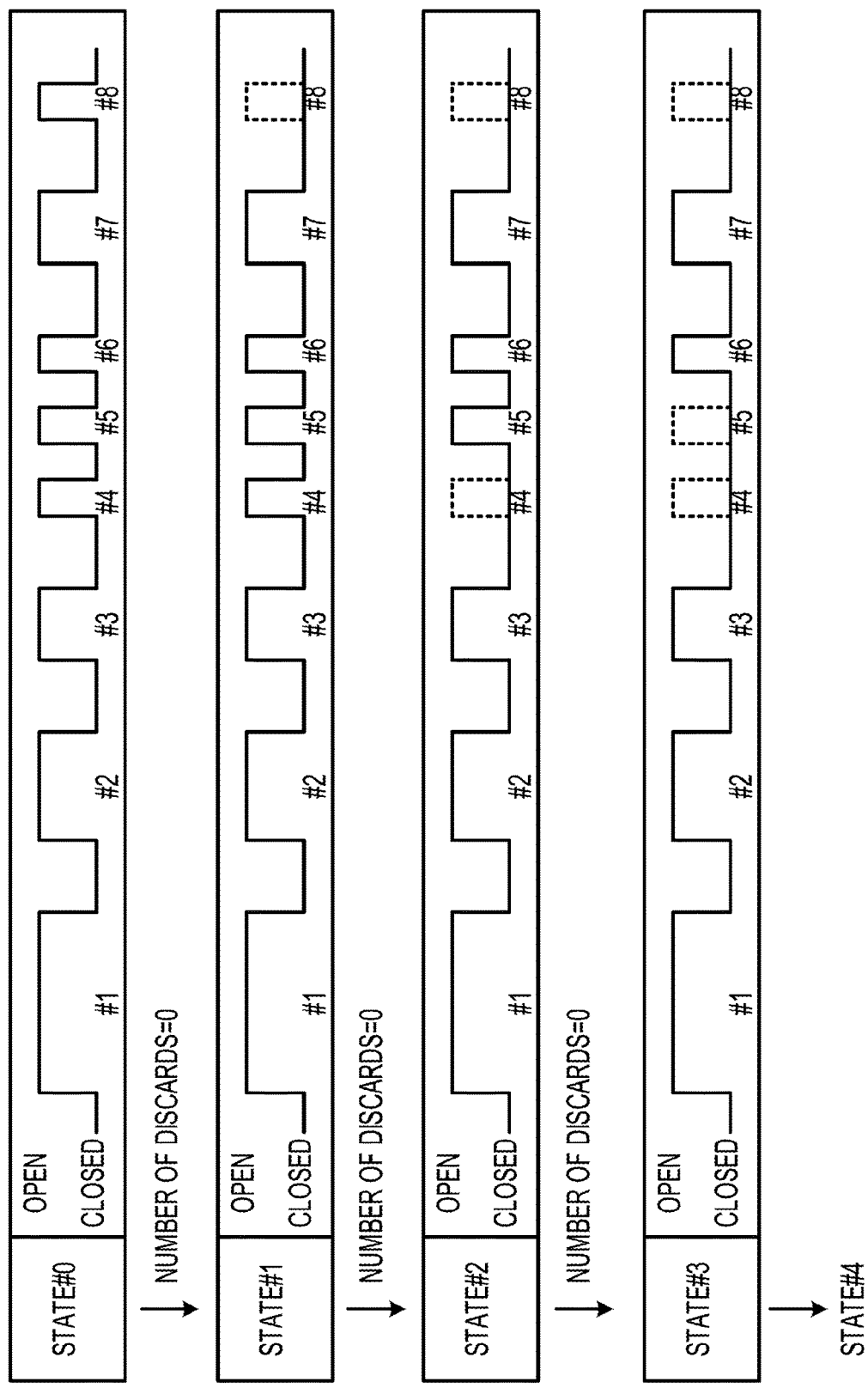
FIG. 10 is a view (part 1) illustrating an example of a change of the state of the gate control table.
Figure 11:
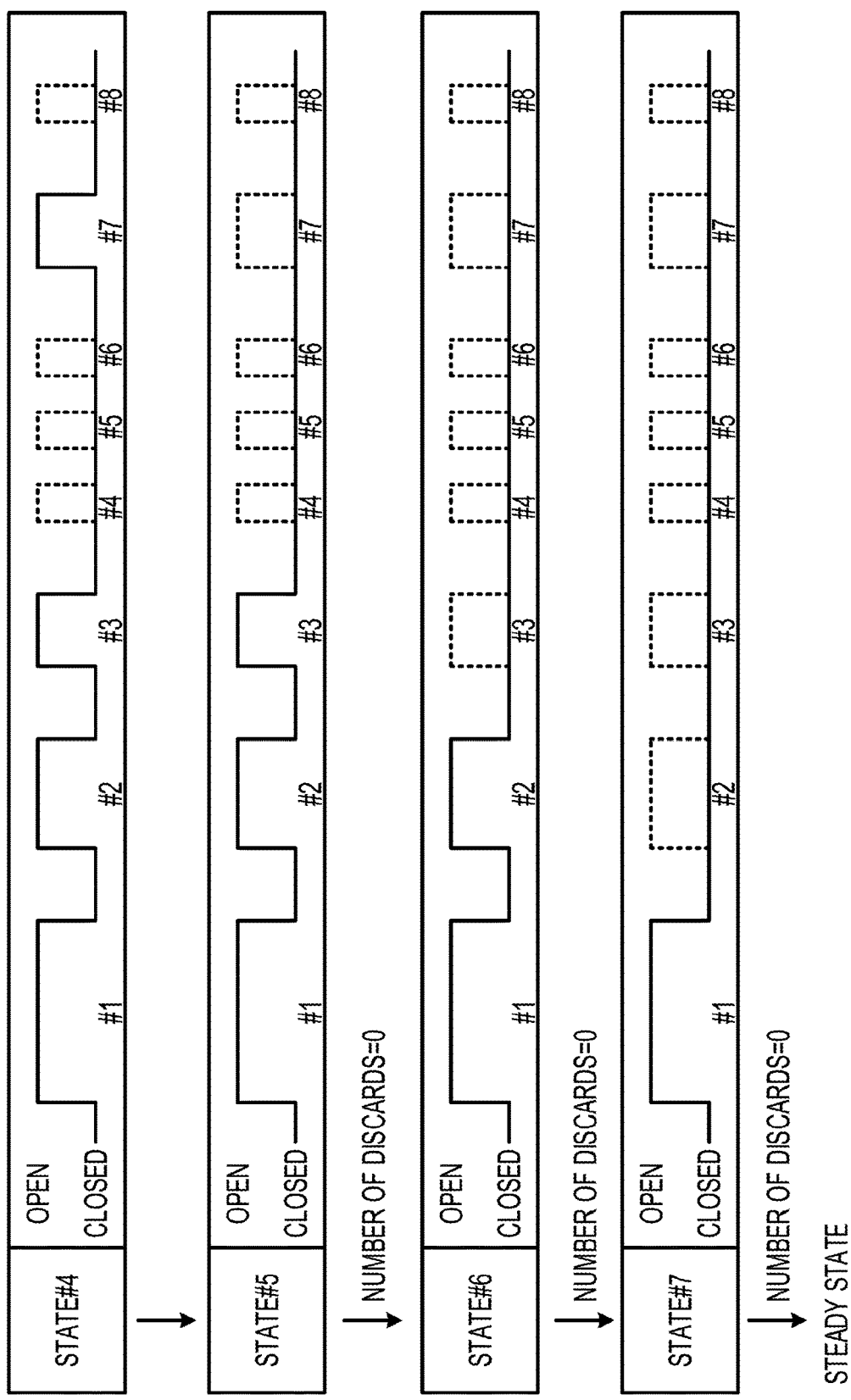
FIG. 11 is a view (part 2) illustrating an example of a change of the state of the gate control table.

FIG. 10 and FIG. 11 are views illustrating an example of a change of the state of the gate control table 130. FIG. 10 and FIG. 11 illustrate a state number of the gate control table 130, and open periods #1 to #8 of the gate (#2) 44 on the low priority class side according to the gate control table 130 in the corresponding state.

In the present example, the table change processor 103 changes the gate control table 130 from the initial state #0 to the state #7 as a final step, step by step. FIG. 10 illustrates the first half portion of the change, and FIG. 11 illustrates the second half portion of the change.

The gate controller 102 performs a gate control according to the gate control table 130 in the initial state #0 (i=0) (operation St12). Since the number of discarded MBH packets within the cycle T of the gate control is 0 (<TH) ("Yes" in operation St13), the table change processor 103 changes the gate control table 130 to the state #1 (i=1) (operation St14 to St16). Accordingly, the open period #8 is deleted from the gate control table 130.

Next, the gate controller 102 performs a gate control according to the gate control table 130 in the state #1 (operation St12). Since the number of discarded MBH packets within the cycle T of the gate control is 0 (<TH) ("Yes" in operation St13), the table change processor 103 changes the gate control table 130 to the state #2 (i=2) (operation St14 to St16). Accordingly, the open period #4 is deleted from the gate control table 130. Thereafter, the same processing as described above is repeated until the gate control table 130 is placed in the state #7 as the final step.

The gate controller 102 performs a gate control according to the gate control table 130 in the state #7 (i=7) (operation St12). Since the number of discarded MBH packets within the cycle T of the gate control is 0 (<TH) ("Yes" in operation St13), the table change processor 103 sets the variable i to 8 (operation St14). Since the variable i is larger than the predetermined value Imax (=7) ("No" in operation St15), the table change processor 103 returns the variable i to 7 (operation St23), and shifts to the steady state (operation St22).

In this manner, when the number of discarded MBH packets does not reach the threshold TH, the table change processor 103 changes the gate control table 130 such that for each time slot within an open period of a predetermined value or less, the output of MBH packets from the gate 44 becomes impossible. Thus, the load of gate control in the CPU 10 is reduced.

Figure 12:
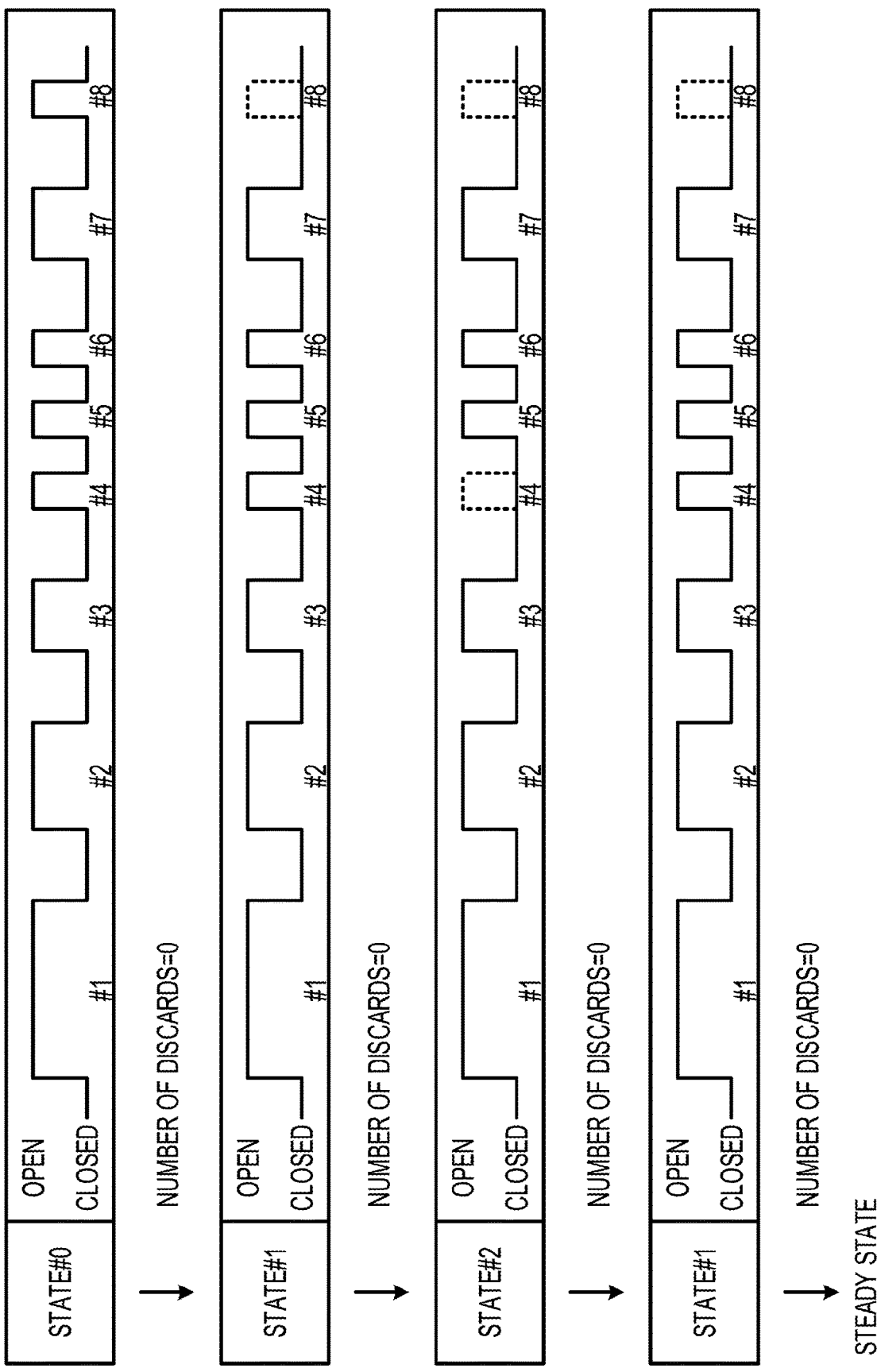
FIG. 12 is a view illustrating another example of a change of the state of the gate control table.

FIG. 12 is a view illustrating another example of a change of the state of the gate control table 130. In the present example, the table change processor 103 changes the gate control table 130 from the initial state #0 to the state #2, step by step, in the same procedure as described above, and then returns the gate control table 130 to the state #1.

Next, the gate controller 102 performs a gate control according to the gate control table 130 in the state #2 (operation St12). Since the number of discarded MBH packets within the cycle T of the gate control TH ("No" in operation St13), the table change processor 103 changes the gate control table 130 to the state #1 (i=1) (operation St17 to St19). Thus, the open period #4 is set again in the gate control table 130.

The gate controller 102 performs a gate control according to the gate control table 130 in the state #1 (operation St20). Since the number of discarded MBH packets within the cycle T of the gate control is 0 (<TH) ("Yes" in operation St21), the table change processor 103 shifts to the steady state (operation St22).

In this manner, when the number of discarded MBH packets reaches the threshold TH, the table change processor 103 changes the gate control table 130 such that for each time slot within an open period of a predetermined value or less which makes the output of MBH packets from the gate 44 impossible, the output of MBH packets becomes possible. Thus, under the condition that the number of discards is less than the threshold TH, the table change processor 103 may delete the maximum number of open periods. Therefore, the load of gate control in the CPU 10 is more effectively reduced.

When the number of discarded MBH packets does not reach the threshold TH, the table change processor 103 selects one open period from open periods of a predetermined value or less in order from the shortest period, and changes the gate control table 130 such that for each time slot within the selected open period, the output of MBH packets from the gate 44 is impossible. When the number of discarded MBH packets reaches the threshold TH, the table change processor 103 changes the gate control table 130 such that for each time slot within the open period that is selected immediately before, the output of MBH packets from the gate 44 is possible.

Thus, the table change processor 103 may delete open periods of a predetermined value or less one by one from the gate control table 130, and thus may highly accurately control the number of open periods. The present disclosure is not limited thereto, and for example, the table change processor 103 may delete open periods of a predetermined value or less at once from the gate control table 130.

As in the following example, the table change processor 103 may change the state of the gate control table 130 by a plurality of steps according to the load of the CPU 10 (usage rate (%)).

Figure 13:
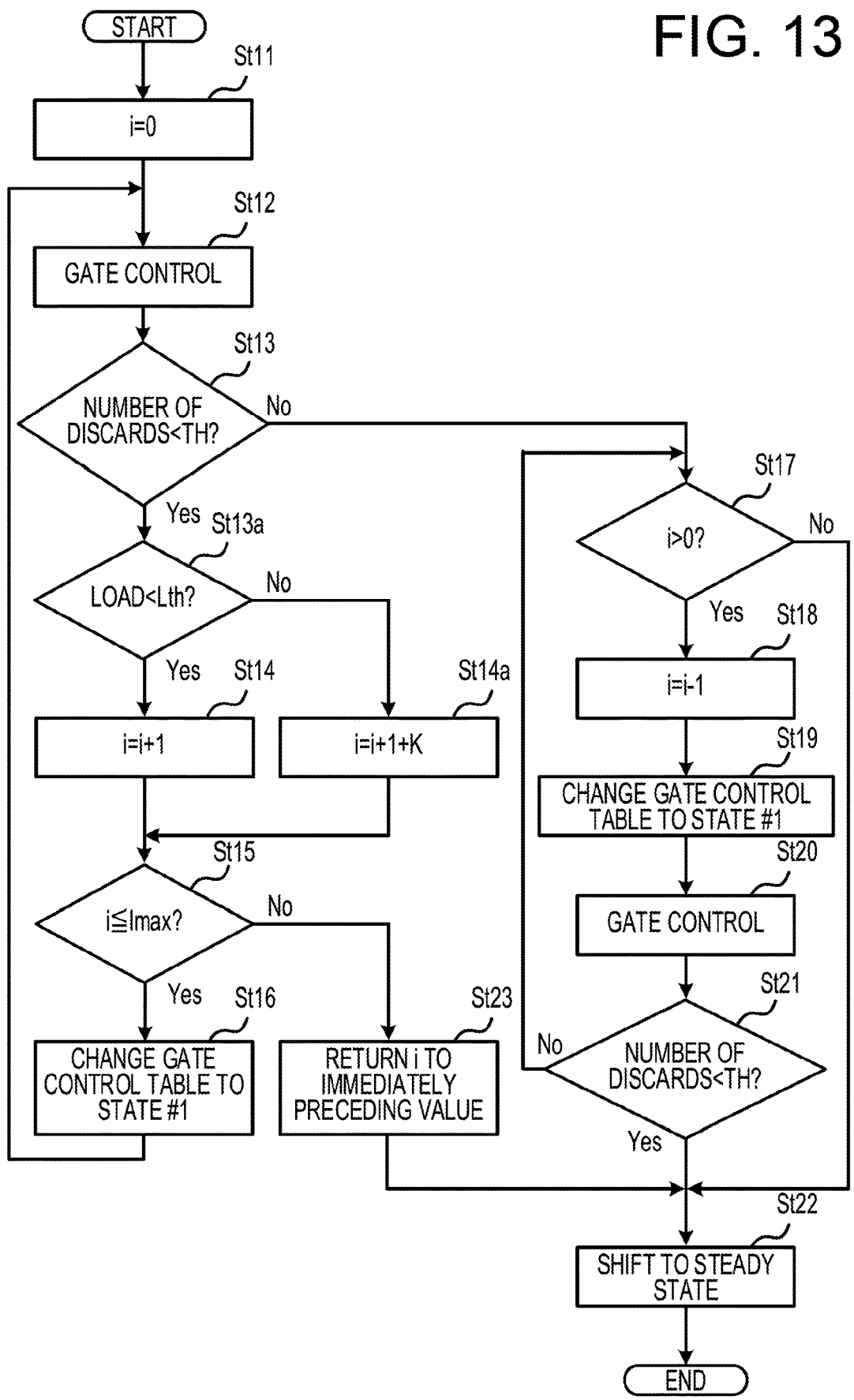
FIG. 13 is a flowchart illustrating another example of a change processing of the gate control table.

FIG. 13 is a flowchart illustrating another example of a change processing of the gate control table 130. In FIG. 13, processings common to those in FIG. 9 are given the same signs, and descriptions thereof will be omitted.

When the number of discards is less than the threshold TH ("Yes" in operation St13), the table change processor 103 acquires the load of the CPU 10 from the load monitoring unit 106 and compares the load to a threshold Lth (operation St13a).

When the load of the CPU 10 is less than the threshold Lth ("Yes" in operation St13a), the table change processor 103 adds 1 to the variable i (operation St14). Thereafter, respective processings subsequently to operation St15 are executed.

When the load of the CPU 10 is equal to or greater than the threshold Lth ("No" in operation St13a), the table change processor 103 adds 1 and a predetermined value K (an integer of 1 or more) to the variable i (operation St14a). Thereafter, respective processings subsequently to operation St15 are executed. In this case, since the state of the gate control table 130 is changed by two or more steps, a plurality of open periods are deleted from the gate control table 130. Thus, the load of the CPU 10 is effectively reduced. The threshold Lth is determined according to, for example, a performance of the CPU 10.

Next, descriptions will be made on a change example of the state of the gate control table 130, with reference to the above described flowchart.

Figure 14:
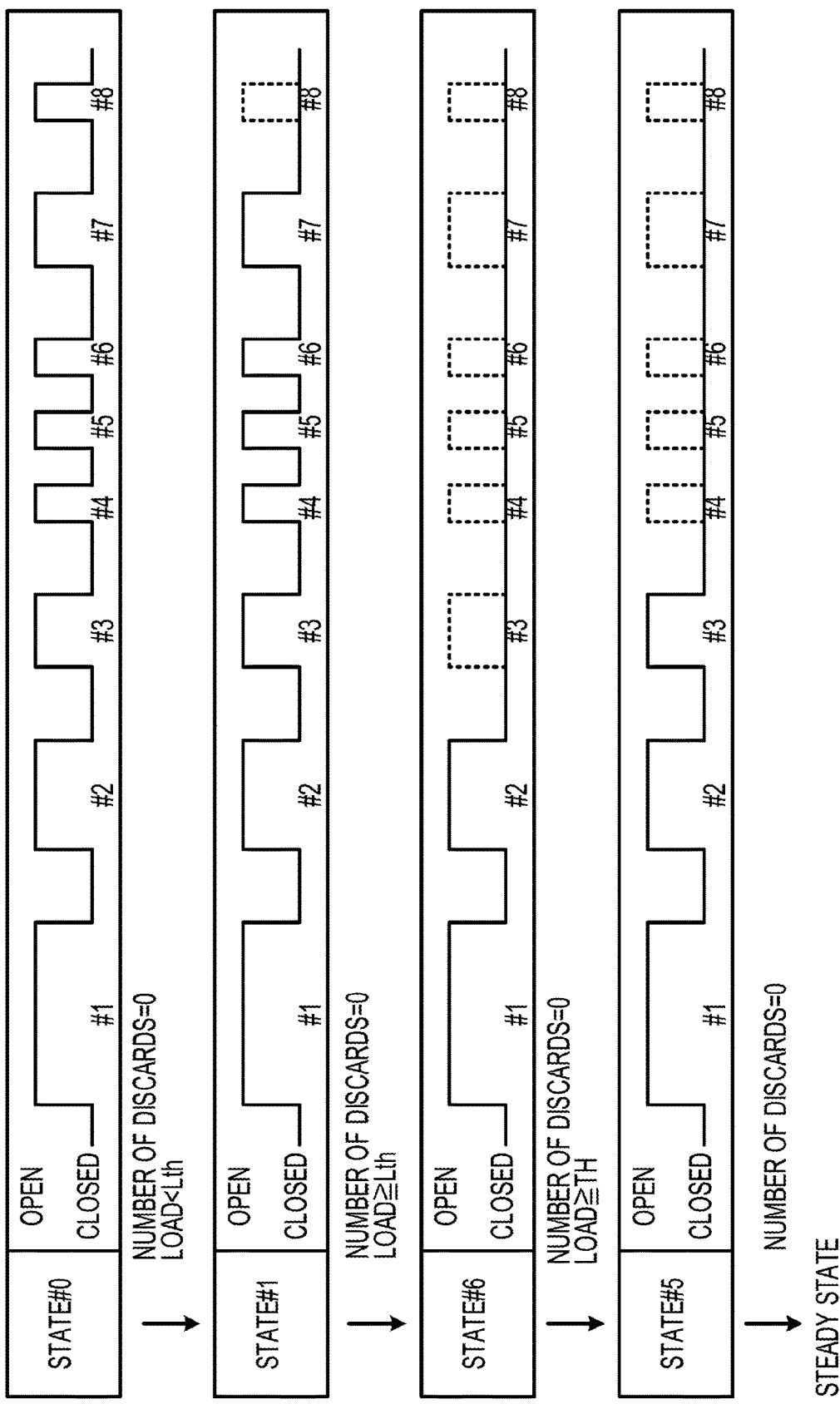
FIG. 14 is a view illustrating another example of a change of the state of the gate control table.

FIG. 14 is a view illustrating another example of a change of the state of the gate control table 130. In the present example, the table change processor 103 changes the gate control table 130 from the initial state #0 to the state #1 in the same procedure as described above, and then, changes the gate control table 130 to the state #6 at once according to the load of the CPU 10. In the present example, the predetermined value K is set to 4.

The gate controller 102 performs a gate control according to the gate control table 130 in the initial state #0 (i=0) (operation St12). Since the number of discarded MBH packets within the cycle T of the gate control is 0 (<TH) ("Yes" in operation St13), and the load of the CPU 10 is less than the threshold Lth ("Yes" in operation St13a), the table change processor 103 changes the gate control table 130 to the state #1 (i=1) (operation St14 to St16). Accordingly, the open period #8 is deleted from the gate control table 130.

Next, the gate controller 102 performs a gate control according to the gate control table 130 in the state #1 (operation St12). Since the number of discarded MBH packets within the cycle T of the gate control is 0 (<TH) ("Yes" in operation St13), and the load of the CPU 10 is equal to or greater than the threshold Lth ("No" in operation St13a), the table change processor 103 changes the gate control table 130 to the state #6 (i=6(=1+K)) (operation St14a to St16). Accordingly, the open periods #3 to #7 are deleted from the gate control table 130.

Next, the gate controller 102 performs a gate control according to the gate control table 130 in the state #6 (operation St12). Since the number of discarded MBH packets within the cycle T of the gate control TH ("No" in operation St13), the table change processor 103 returns the gate control table 130 to the state #5 (i=5) (operation St17 to St19).

The gate controller 102 performs a gate control according to the gate control table 130 in the state #5 (operation St20). Since the number of discarded MBH packets within the cycle T of the gate control is 0 (<TH) ("Yes" in operation St21), the table change processor 103 shifts to the steady state (operation St22).

In this manner, in a case where the number of discards does not reach the threshold TH, when the load is equal to or greater than the threshold Lth, the table change processor 103 selects a plurality of open periods from open periods of a predetermined value or less in order from the shortest period. Then, the table change processor 103 changes the gate control table 130 such that for each time slot within each of the selected open periods, the output of MBH packets is impossible. Thus, the load of a packet transfer processing in the CPU 10 is effectively reduced.

Next, descriptions will be made on a change processing of the gate control table 130, in a steady state. In the steady state, the table change processor 103 changes the state of the gate control table 130 according to the storage amount of MBH packets within the low priority queue 42.

Figure 15:
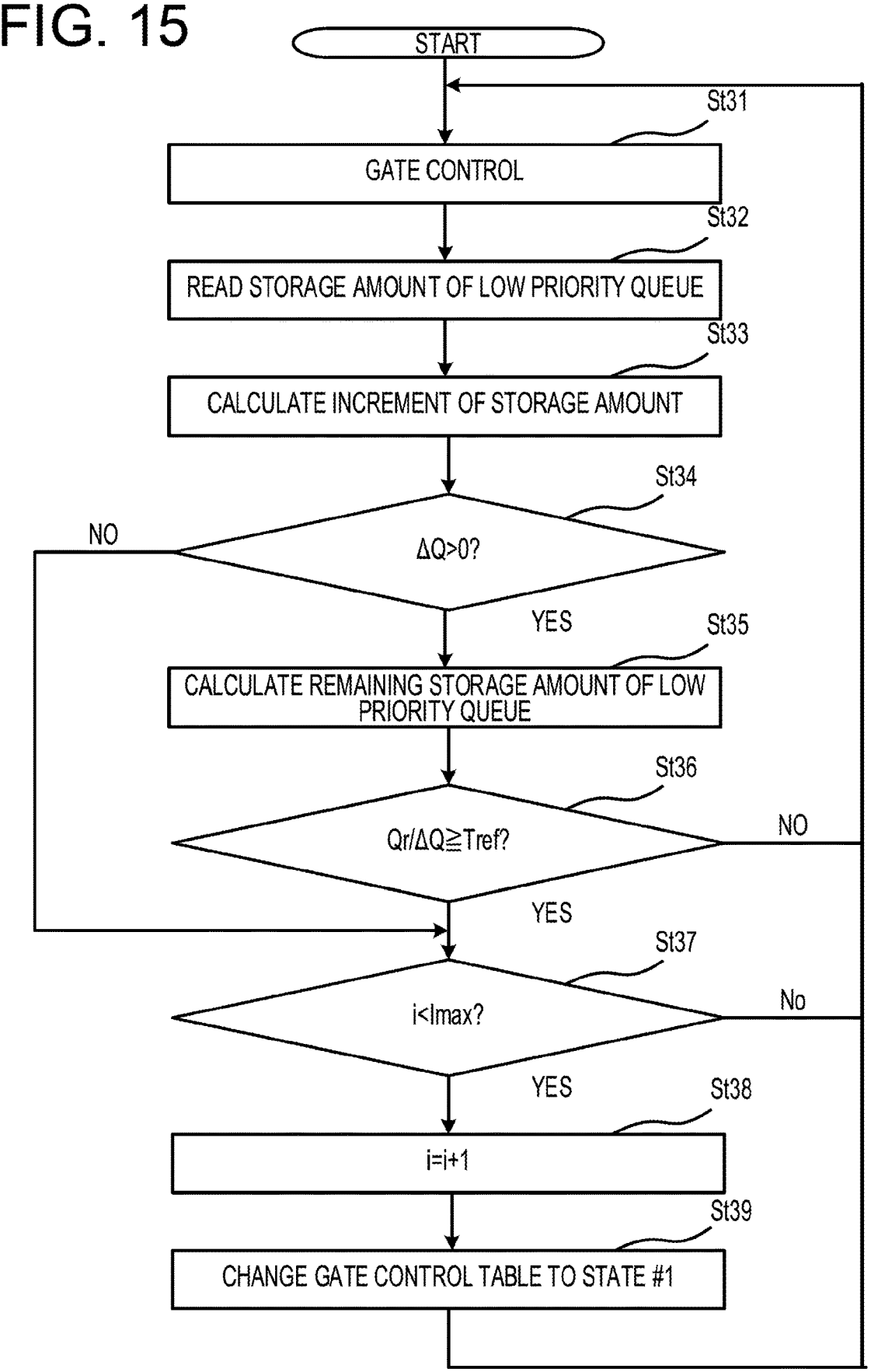
FIG. 15 is a flowchart illustrating an example of a change processing of the gate control table, in a steady state.

FIG. 15 is a flowchart illustrating an example of a change processing of the gate control table 130, in the steady state. The present processing is executed after the above described operation St22.

The gate controller 102 performs a gate control according to the gate control table 130 in the state #i determined in the above described processing (operation St31). Then, the table change processor 103 reads a storage amount Q of MBH packets within the low priority queue 42 by the queue monitoring unit 105 (operation St32).

Next, the table change processor 103 calculates an increment $\Delta Q$ (=Q-Q') of the storage amount Q from the previously read storage amount Q' (operation St33). Then, the table change processor 103 determines whether the increment ΔQ is larger than 0 (operation St34).

When the increment ΔQ is larger than 0 ("Yes" in operation St34), the table change processor 103 calculates a remaining storage amount Qr within the low priority queue 42, from the increment ΔQ (operation St35). Here, for example, the table change processor 103 calculates the remaining storage amount Qr by subtracting the current storage amount Q from the maximum storage amount Qmax of the low priority queue 42.

Next, the table change processor 103 compares Qr/AQ to a predetermined value Tref (operation St36). The Qr/AQ indicates the number of cycles T of gate control until the storage amount Q of the low priority queue 42 reaches the maximum storage amount Qmax.

Figure 16:
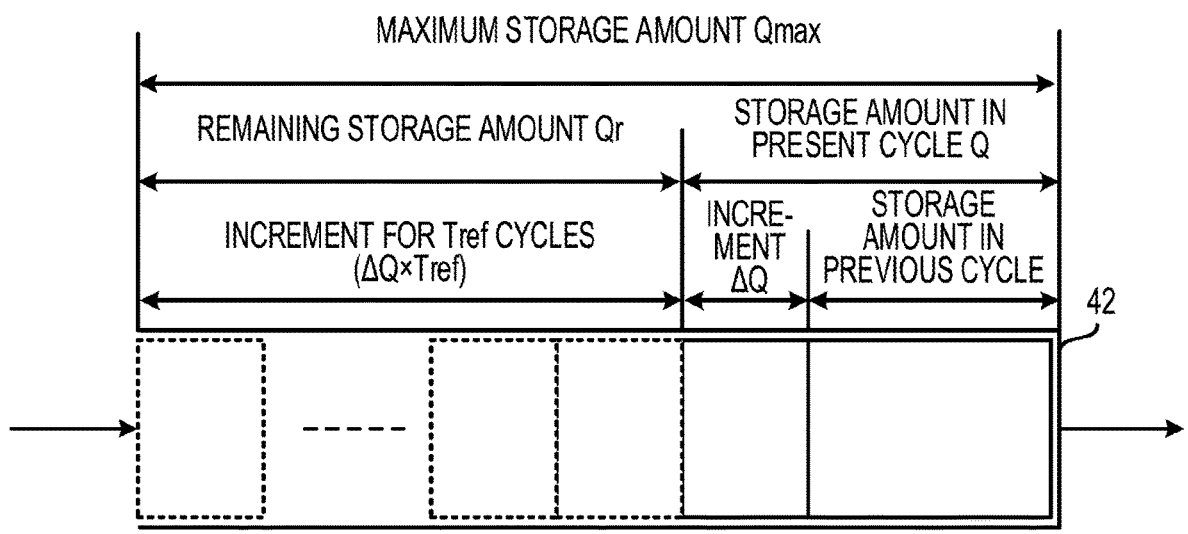
FIG. 16 is a view illustrating an increment of a storage amount of a low priority queue.

FIG. 16 is a view illustrating the increment ΔQ of the storage amount Q of the low priority queue 42. The table change processor 103 calculates a difference between the storage amount Q in the current cycle T (the present cycle) and the storage amount Q' in the previous cycle T (the previous cycle), as the increment ΔQ.

When it is assumed that the storage amount Q increases by the increment ΔQ in one cycle T, the table change processor 103 calculates how many cycles T cause the storage amount Q to reach the maximum storage amount Qmax, by Qr/AQ. The table change processor 103 determines whether the storage amount Q reaches the maximum storage amount Qmax by at least Tref cycles T by comparing Qr/AQ to the predetermined value Tref. When the storage amount Q reaches the maximum storage amount Qmax by at least Tref cycles T, the table change processor 103 determines that there is a margin in the remaining storage amount Qr of the low priority queue 42 for the input amount of MBH packets.

Referring back to FIG. 15, when Qr/AWref is established ("Yes" in operation St36), the table change processor 103 compares the variable i to the predetermined value Imax (operation St37). When the variable i is equal to or greater than the predetermined value Imax ("No" in operation St37), since the change of the gate control table 130 is impossible, respective processings subsequently to operation St31 are executed again.

When the variable i is smaller than the predetermined value Imax ("Yes" in operation St37), the table change processor 103 adds 1 to the variable i (operation St38). Then, the table change processor 103 changes the gate control table 130 to the state #i (operation St39). Accordingly, since an open period of a predetermined value or less is deleted from the gate control table 130, the load of the CPU 10 is reduced. Thereafter, respective processings subsequently to operation St31 are executed again. When Qr/ΔQ<Tref is established ("No" in operation St36), since the table change processor 103 determines that there is no margin in the storage amount Q, respective processings subsequently to operation St31 are executed again.

When the increment ΔQ is equal to or less than 0 ("No" in operation St34), since the storage amount Q of the low priority queue 42 decreases, the table change processor 103 determines that there is a margin in the storage amount Q. Then, respective processings subsequently to operation St37 are executed. In this manner, the change processing of the gate control table 130 is executed in the steady state.

In this manner, in the steady state, the table change processor 103 changes the gate control table 130 according to the increment (increment ΔQ) of the storage amount Q of the low priority queue 42 such that for each time slot within an open period of a predetermined value or less, the output of MBH packets from the gate 44 becomes impossible. Thus, it becomes possible to reduce the load of the CPU 10 in the steady state as well.

The layer 2 switch 1 in the present example performs a priority control of packets by using the CPU 10 and the network processor 15, but, instead of this, a priority control may be performed by a circuit composed of hardware such as an FPGA.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A packet transfer device comprising:
   a circuit configured to include a first queue to store a first packet classified into a high priority class and a second queue to store a second packet classified into a low priority class having a lower priority than the high priority class, the circuit outputting the first packet and the second packet;
   a memory configured to store data configured to indicate possibilities of output for the first packet and the second packet for each time slot; and
   a processor coupled to the memory and the processor configured to:
   control the output of the first packet and the second packet for each time slot according to the data stored in the memory;
   count a number of discards of the second packet within the second queue in a predetermined cycle; and
   change the data stored in the memory, when the number of discards of the second packet within the second queue is less than a first predetermined value, so as to-reduce an output period of the second packet within the second queue for every time slot in the predetermined cycle by reducing a number of time slots for which the second packet is outputted according to a short order of the output period.

2. The packet transfer device according to claim 1, wherein the processor is configured to, when the number of discards is greater than or equal to the first predetermined value, change the data stored in the memory so that the second packet is outputted in the time slot within the output period.

3. The packet transfer device according to claim 2, wherein the processor is configured to:
   when the number of discards is less than the first predetermined value, select one period according to the short order of the output period, and change the data stored in the memory so that the second packet is not outputted in the time slot within the selected period, and
   when the number of discards is greater than or equal to the first predetermined value, change the data stored in the memory so that the second packet is outputted in the time slot within a period selected immediately before.

4. The packet transfer device according to claim 2, wherein the processor is further configured to:
   monitor a storage amount of the second packet within the second queue in each predetermined cycle, and wherein the processor is configured to, when the number of discards is greater than or equal to the first predetermined value, change the data stored in the memory so that the second packet is outputted in the time slot within the output period, and change the data stored in the memory according to an increment of the monitored storage amount so that the second packet is not outputted in the time slot within the output period.

5. The packet transfer device according to claim 3, wherein the processor is further configured to:

monitor a load of a transfer processing of the first packet and the second packet, wherein the processor is configured to, when the number of discards is less than the first predetermined value and the monitored load is greater than or equal to a second predetermined value, select a plurality of periods according to the short order of the output period, and change the data stored in the memory so that the second packet is not outputted in the time slot within the selected plurality of periods.

6. A packet transfer method comprising:

controlling an output of a first packet classified into a high priority class and a second packet classified into a low priority class having a lower priority than the high priority class for each time slot according to data configured to indicate possibilities of output for the first packet and the second packet for each time slot, the first packet being stored in a first queue, the second packet being stored in a second queue, and the data being stored in a memory;

counting a number of discards of the second packet within the second queue in a predetermined cycle; and changing the data stored in the memory, when the number of discards of the second packet within the second queue is less than a first predetermined value, so as to reduce an output period of the second packet within the second queue for every time slot in the predetermined cycle by reducing a number of time slots for which the second packet is outputted according to a short order of the output period, by a processor.

7. The packet transfer method according to claim 6, wherein the processor, when the number of discards is greater than or equal to the first predetermined value, changes the data stored in the memory so that the second packet is outputted in the time slot within the output period.

8. The packet transfer method according to claim 7, wherein the processor:

when the number of discards is less than the first predetermined value, selects one period according to the short order of the output period, and changes the data stored in the memory so that the second packet is not outputted in the time slot within the selected period, and when the number of discards is greater than or equal to the first predetermined value, changes the data stored in the memory so that the second packet is outputted in the time slot within a period selected immediately before.

9. The packet transfer method according to claim 7, wherein the processor further monitors a storage amount of the second packet within the second queue in each predetermined cycle, and wherein the processor, when the number of discards is greater than or equal to the first predetermined value, changes the data stored in the memory so that the second packet is outputted in the time slot within the output period, and changes the data stored in the memory according to an increment of the monitored storage amount so that the second packet is not outputted in the time slot within the output period.

10. The packet transfer method according to claim 8, wherein the processor further monitors a load of a transfer processing of the first packet and the second packet, and wherein the processor, when the number of discards is less than the first predetermined value and the monitored load is greater than or equal to a second predetermined value, selects a plurality of periods according to the short order of the output period, and changes the data stored in the memory so that the second packet is not outputted in the time slot within the selected plurality of periods.

* * * * *